H. S. BARTHOLOMEW.
Assignor to himself and G. W. BARTHOLOMEW.
Bit-Stock.
No. 8,115. Reissued March 12, 1878.
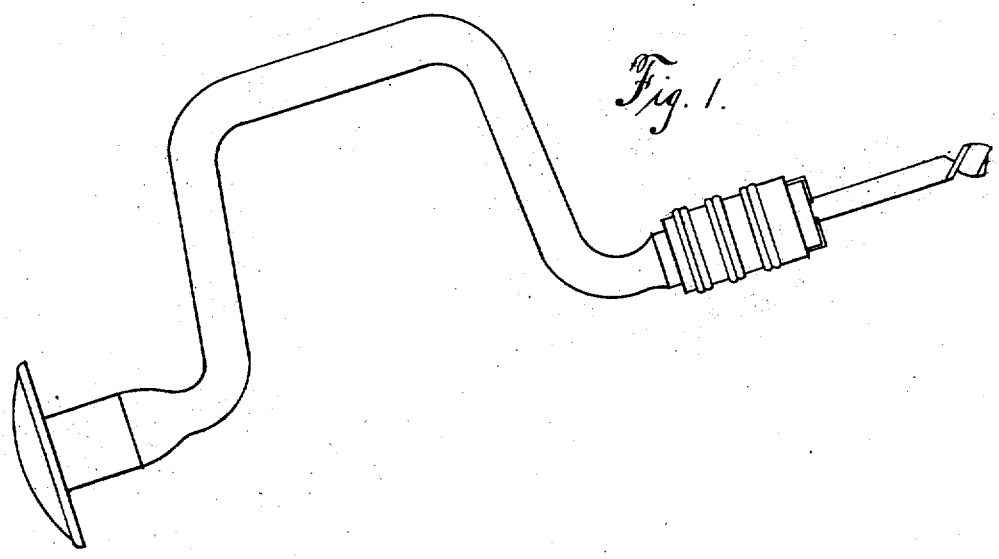
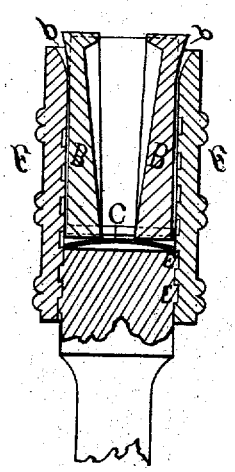
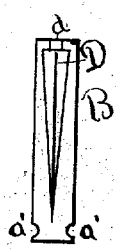
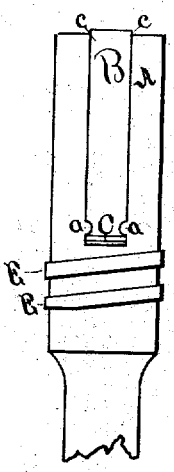
WITNESSES
W. B. Thomson.
P. J. Markley
INVENTOR
Harry S. Bartholomew.
By James Shepard Atty.
N. PETERS, PHOTO-LITHOGRAPHER, WASHINGTON, D. C.

UNITED STATES PATENT OFFICE.

HARRY S. BARTHOLOMEW, OF BRISTOL, CONNECTICUT, ASSIGNOR TO HIMSELF AND GEORGE W. BARTHOLOMEW.

IMPROVEMENT IN BIT-STOCKS.

Specification forming part of Letters Patent No. 65,046, dated May 28, 1867; Reissue No. 8,115, dated March 12, 1878; application filed February 11, 1878.

*To all whom it may concern:*

Be it known that I, HARRY S. BARTHOLOMEW, of Bristol, county of Hartford, and State of Connecticut, have invented certain new and useful Improvements in Bit-Stocks; and to enable others skilled in the art to make and use the same, I will proceed to describe the same, reference being had to the accompanying drawings, in which the same letter indicates like parts in each of the figures.

The nature of this invention will be understood from the specification and drawings.

It relates to the mode of construction of that portion of a bit-stock in which the bit is held true and firmly in its proper position without having bestowed any special pains in fitting the bit thereto, which construction consists in the combination of the holding parts, as hereinafter described, and in the means for keeping the grasping-faces of the jaws directly opposite each other, as hereinafter described.

In the accompanying drawings, Figure 1 is a bit-stock fashioned after this improvement. Fig. 2 is a sectional view of the same broken off from the brace. Fig. 3 is an outside view of the bit-holder having its fastening-sleeve removed therefrom, showing the edge of one of the jaws and the dovetail by which said jaws are held in place and rendered self-adjustable, and the position and location of the spring by which said jaws are actuated and the screw-thread upon which the sleeve is arranged, so that by turning said sleeve thereon the jaws will be compressed or relaxed equally distant from the center of the diameter of the holder or bit-opening. Fig. 4 is a view of one of the jaws.

In Fig. 3, A is the end of the bit-stock, in which the bit is secured for use, having a slot, *c*, cut through the center thereof, in which the jaws are arranged to fit closely and work freely. Near the lower end and across the face surface of this slot *c* are formed protuberances *a*, the office of which is to hold the jaws in their proper places. B are holding-jaws, in the lower or back end of which are formed depressions *a'*. Thus a dovetail is formed upon the end of the jaws. C is an elliptic spring, or its equivalent, arranged in the base of the slot *c*, so that when the depression *a'* is placed onto the protuberance *a*, and the jaw B in the slot *c*, said dovetail formation will rest upon and be actuated by the spring C, to keep the outer ends of said jaws diverging from each other. The inside face of these jaws is provided with angular depressions D, commencing just back of the front end and terminating at a point on the surface near the back end, thereby forming angular faces, which receive the two opposite corners of the bit-shank. *d* are the griping-over jaws or clamps formed in the outer end of the jaws B. The outside surface of these jaws is curved or concave shape, the object of which is to form a wedge, *b*, near the front end of the jaws, so that by turning said sleeve forward onto or over said wedge *b* it (the sleeve) will compress the jaws firmly upon any tool placed between them.

E is a screw-thread formed on the body of the stock just back of the slot *c*. F is a sleeve, which is fitted closely and works freely upon said stock. This sleeve is provided with a screw-thread or depression to allow it to receive or work upon the screw-thread E.

Now, it will readily be seen that, by inserting the shank of a bit into the depression D through the opening in the end of the stock (in the usual way) until the small end of the shank fills the diverging depression D, then, by turning the sleeve firmly onto or over the wedge or curved-shape jaws, they (the clamps *d* in the end of said jaws) will gripe the square, round, or spindle portion of the bit close to its shank. Thus tools or bits of various sizes will be held true and firm without the necessity of fitting the same thereto, as in the usual way.

I believe I have thus shown the nature, construction, and advantage of this invention, so as to enable others skilled to make and use the same therefrom.

I disclaim all mechanism in which any means other than the companion-jaws come in contact with the bit-shank in the act of holding it.

I claim as my invention—

1. That improvement in the holding part of a bit-stock which consists in the combination of the following instrumentalities: first, a socket having a slot cut through the center thereof, in which the jaws fit closely and work freely, so that either end of said jaws may come together when within the slot; second, companion-jaws carrying angular depressions and griping-over clamps on their inside faces, adapted to grasp the bit-shank throughout its whole extent and over its shoulders, as described; and, third, a threaded sleeve-nut traversing the socket longitudinally and closing the jaws directly upon the shank and over its shoulders, substantially as described, and for the purpose specified.

2. In a bit-stock, the protuberance *a*, taking into a corresponding depression, *a'*, in the jaws, substantially as and for the purpose described.

HARRY S. BARTHOLOMEW.

Witnesses:

JAMES SHEPARD,
W. B. THOMSON.